United States Patent [19]

Slicer

[11] Patent Number: 4,820,177

[45] Date of Patent: Apr. 11, 1989

[54] ELECTRICAL DISTRIBUTION SYSTEM HAVING SPECIALLY FORMED AND INSULATED BUS BARS

[75] Inventor: Allan E. Slicer, Brookville, Ind.

[73] Assignee: Square D Company, Palatine, Ill.

[21] Appl. No.: 171,216

[22] Filed: Mar. 18, 1988

Related U.S. Application Data

[63] Continuation of Ser. No. 920,925, Oct. 16, 1986, abandoned, which is a continuation of Ser. No. 650,376, Sep. 13, 1984, abandoned.

[51] Int. Cl.⁴ .............................................. H01R 25/16
[52] U.S. Cl. ...................................... 439/207; 439/114
[58] Field of Search ............... 439/110, 114, 115, 121, 439/207, 208, 212, 213

[56] References Cited

U.S. PATENT DOCUMENTS

| | | | |
|---|---|---|---|
| Re. 26,310 | 11/1967 | Moodie et al. | 174/68 B |
| 3,126,240 | 3/1964 | Christensen et al. | 339/22 B |
| 3,183,299 | 5/1965 | Johnston et al. | 339/22 B |
| 3,187,086 | 6/1965 | Moodie et al. | 174/68 B |
| 3,384,855 | 5/1968 | Jorgensen et al. | 339/22 B |
| 3,488,621 | 1/1970 | Stevens | 339/22 B |
| 3,566,331 | 2/1971 | Stanback et al. | 339/22 R |
| 3,683,313 | 8/1972 | Weimer et al. | 339/22 B |
| 3,909,098 | 9/1975 | Reed et al. | 339/22 B |

*Primary Examiner*—Eugene F. Desmond
*Attorney, Agent, or Firm*—Larry I. Golden; Richard T. Guttman

[57] ABSTRACT

An electrical distribution system having specially formed and insulated bus bars in back to back, stacked relationship with each other along the length of the busway and spaced apart where tap-off or other connection may be made. The bus bars are formed to be interchangeable, to the extent possible, within a busway section. For example, in a four bar plug-in section, the two inner bus bars are identically formed and interchangeable by rotating the bars 180°. Similarly, the two outer bus bars are also identically formed and interchangeable. The electrical insulation between bus bars is provided by the use of insulating tubes comprising one layer of varnished glass cloth between two layers of polyethylene terephthalate. Each bar is provided with a hump located for tap-off connection along the length of the busway. The insulating tubes are spaced apart from each other on each bus bar to provide a tap-off contact surface on each hump. Each tube is provided with notched out segments which overlie the edge of the bus bar at a transition portion of the hump. A hump insulator is placed longitudinally along the length of the bus bar on the top and bottom of the hump between opposing plug-in bases and hump edge insulators are placed on the edges of the plug-in bars in overlying relationship with the respective notched out segments on the tubes.

7 Claims, 7 Drawing Sheets

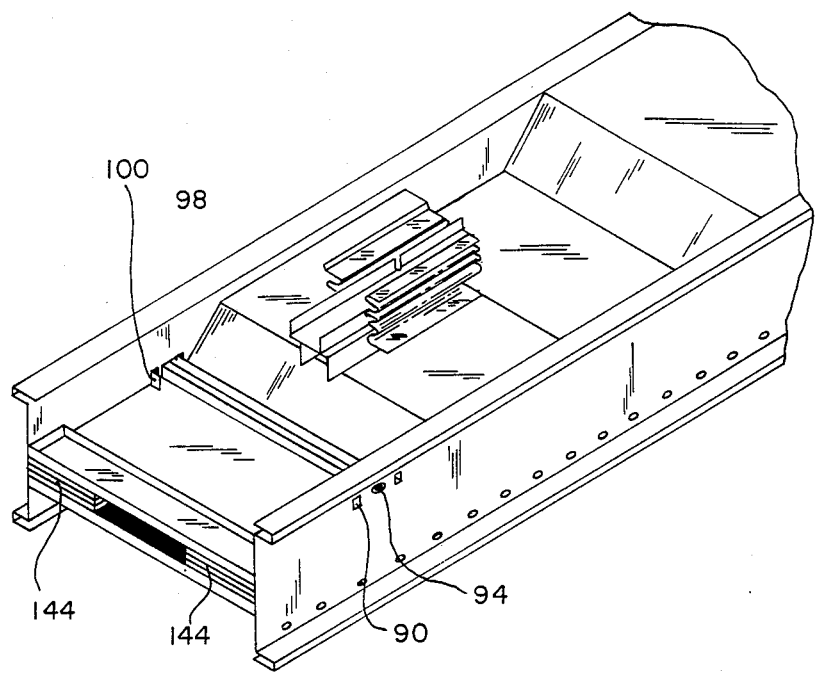
FIG. II

ELECTRICAL DISTRIBUTION SYSTEM HAVING SPECIALLY FORMED AND INSULATED BUS BARS

This application is a continuation of application Ser. No. 920,925, filed on 10/16/86, now abandoned, which was a continuation of application Ser. No. 650,376 filed on 9/13/84, now abandoned.

BACKGROUND OF THE INVENTION

1. FIELD OF THE INVENTION

This invention relates to an electrical distribution system, and more particularly to an improved busway system having sections of both Feeder busway and plug-in busway having specially formed and insulated bus bars.

2. DESCRIPTION OF THE PRIOR ART

The present invention represents an improvement over the electrical distribution systems disclosed in U.S. Pat. No. 3,566,331, issued Feb. 23, 1971 as well as U.S. Pat. No. 3,384,855, issued May 21, 1968, to which reference may be had for description of common features and applications. Other features and applications of the distribution system may be further understood by reference to U.S. Pat. No. 3,187,086, issued June 1, 1965, reissued as U.S. Pat. No. 26,310, on Nov. 28, 1967 as well as U.S. Pat. No. 3,909,098, issued Sept. 30, 1975. Each of the afore-referenced patents is assigned to the same assignee as the instant invention and is hereby incorporated by reference.

SUMMARY OF THE INVENTION

It has been found desirable to envelope or surround the main phase bus bars of the system with a ground bus. A generally U-shaped upper section of the ground bus receives a generally U-shaped lower section of the ground bus with the main phase bus bars captured between the two sections of ground bus. The ground bus, together with a pair of side rails form a housing for the main phase bus bars. Multiple fasteners extend along the length of the busway section on each side, connecting the side rail to both the upper and lower sections of the ground bus and thereby securing the main phase bus bars within the envelope formed by the ground bus sections and also decreasing the electrical ground resistance. This particular housing construction also facilitates heat dissipation from the specially formed and insulated main bus bars. The bus bar formation requires minimum space for confining while permitting splice connection between sections of busway and tap-off connection from the plug-in sections.

The specially formed insulated bus bars are sandwiched in back-to-back engagement with each other along sections of busway where no connections will be made, while they are spaced apart where tap-off or other connection may be made. Humps are provided in the main phase bus bars at the locations of the plug-in openings.

It is an object of the present invention to provide an improved electrical distribution system of economic construction.

It is a further object of this invention to incorporate insulated bus bars in back to back association which include humps and offsets that space the bars apart at tap off and splice connection locations.

It is a further object of this invention to provide versatile components which may be used in several application.

It is a further object of this invention to provide suitable insulation for bus bars which have humps at tap off locations and offset connecting portions where splice connections will be made between busway sections.

Further objects and features of the invention will be readily apparent to those skilled in the art from the following specification including the appended claims and the accompanying drawings of the invention in which:

BRIEF DESCRIPTION OF THE DRAWINGS

FIG. 11 is a partial perspective view showing a double sandwich section of plug-in busway in accordance with the present invention.

DESCRIPTION OF THE PREFERRED EMBODIMENT

Figure 1:
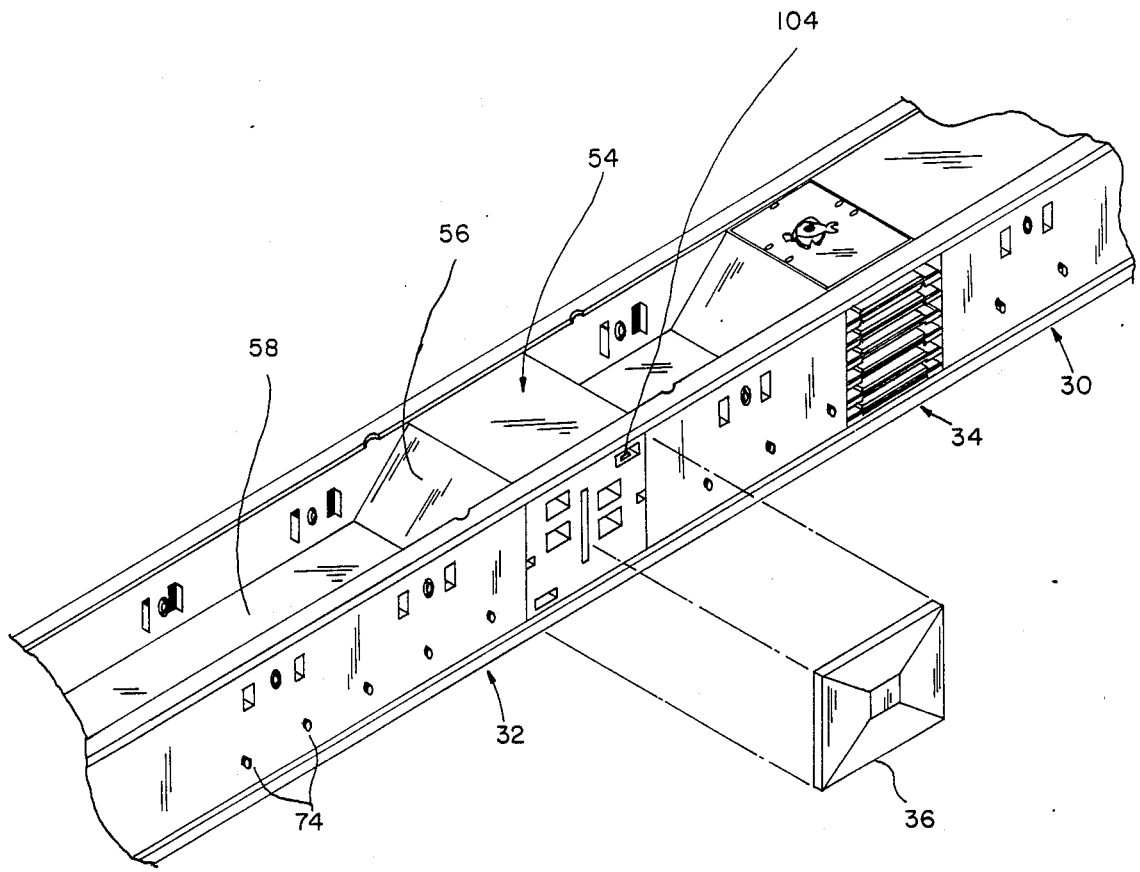
FIG. 1 is a perspective view showing connected feeder and plug-in sections of busway in accordance with the present invention.

The electrical distribution system of the present invention is described with respect to both feeder sections of bus bars generally identified as 30 in FIG. 1 of the Drawings and plug-in sections of bus bars identified generally by reference character 32. The present design is intended for busway systems carrying from 800A through 5000A, although it is not necessarily restricted to such applications. The current carrying capacity of the busway is dependent upon the size and material of the individual bus bars as well as the number of runs of bus bars within a busway section. The '855 patent discloses both single and double runs of bus bars. The plug-in sections are provided with plug-in openings 34 at various locations along its length as discussed, for example, in the previously referred to '331 Patent. The plug-in openings facilitate the tap-off of current from those locations and are covered by a swingable door 36 when the opening is not being used. The bus bars are carried between a pair of side rails 38 which will later be further described.

The main phase bus bars 40 of the instant invention are appropriately insulated and are carried in stacked back-to-back relationship except where physical separation of the bus bars 40 is required to facilitate a splice connection between sections of busway or at the tap off locations of the plug-in busway. At those locations where connections may be made, the bus bars are spaced apart to provide sufficient clearance between bars for connections.

Figure 5:
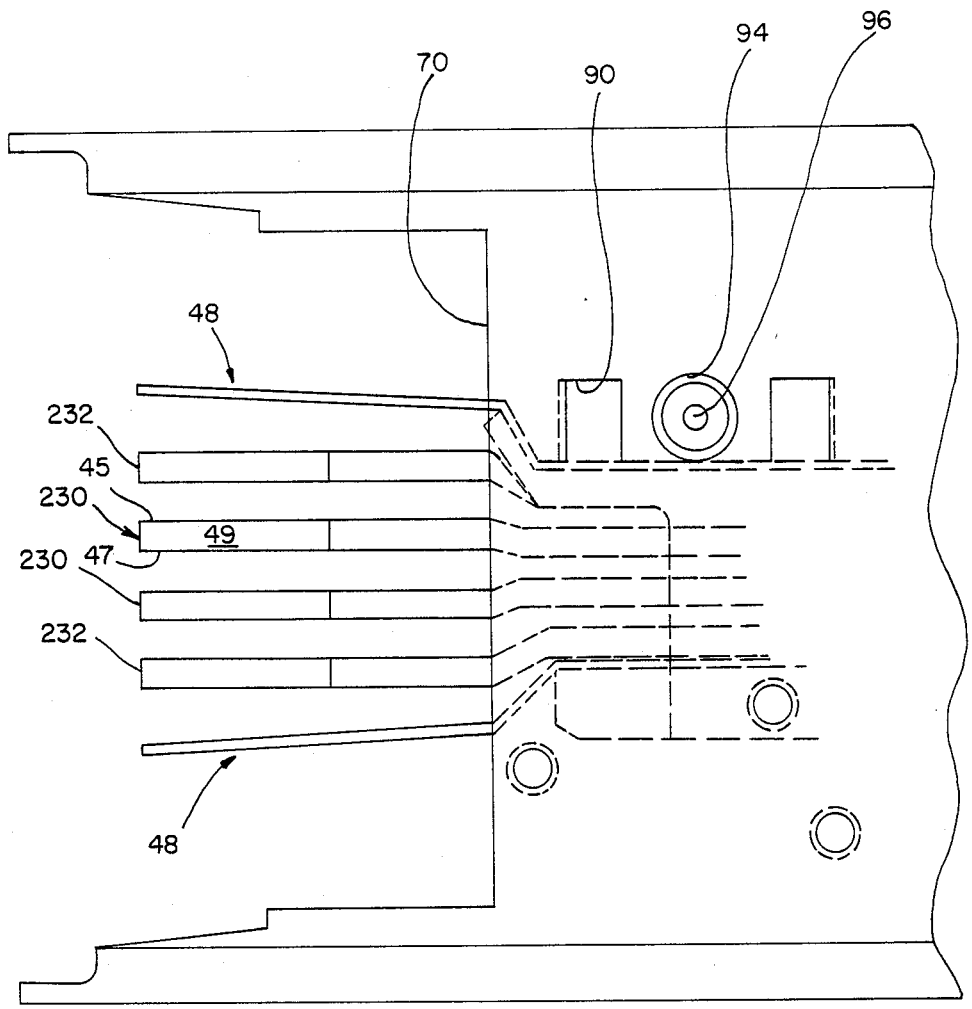
FIG. 5 is a partial side view showing an end of a section of busway in accordance with the present invention.

The bus bars in the feeder sections of busway include a flared portion 48 at each end while the plug-in sections of busway, in addition to the same flared end portion, also include humps 54 in the bus bars at each plug-in location. FIG. 5 shows the flared end portions of bus bars in a four-pole section of busway.

In both the feeder and plug-in sections, the two inner bus bars 230 are identically formed and are interchangable by rotating the bars 180°, the only difference then being the direction of the humps and flared end portions in the busway section. Similarly the two outer bus bars 232 are interchangeable and positioned in mirror image relationship with each other.

As an example, a 10 foot section of busway could use bus bars formed from blank tin plated rawstock aluminum with the following dimensions: Outer bars-initial length 120.18 inches, formed with flared end portions and humps raised 0.636 inches. The center of the flared end portion 48 spaced 11.05 inches from the end of the bar and intermediate humps 54 having centers spaced apart by 24 inches, each hump having straight length of 6 inches while the flared end portions each extend approximately 2.4 inches. Inner bars 230 - initial length 118.25 inches, formed with flared end portions 48 and humps 54 raised 0.217 inches, with spacing and lengths of the humps and flared end portions the same as on the outer bars. The transitions to form the humps and flared end portions are made at approximately 45° for all bars.

Figure 6:
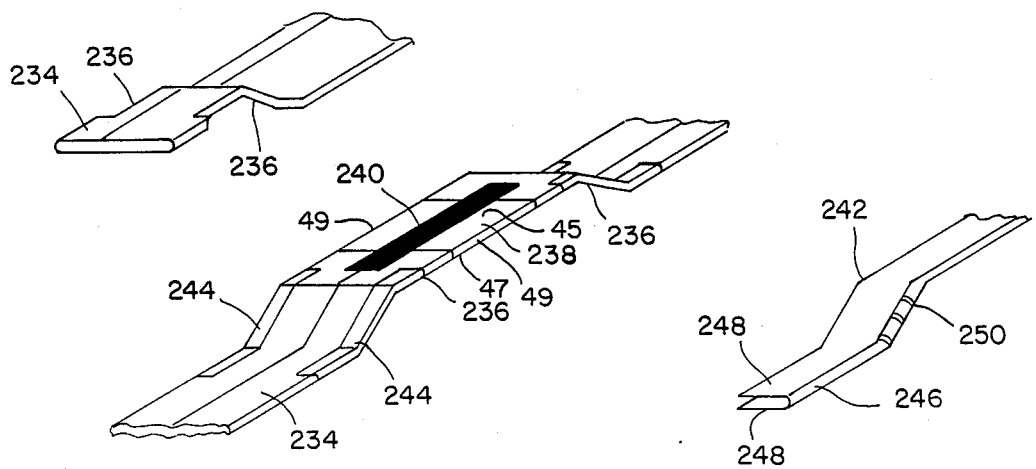
FIG. 6 is a perspective view showing an insulated bus bar in accordance with the present invention.
Figure 7:
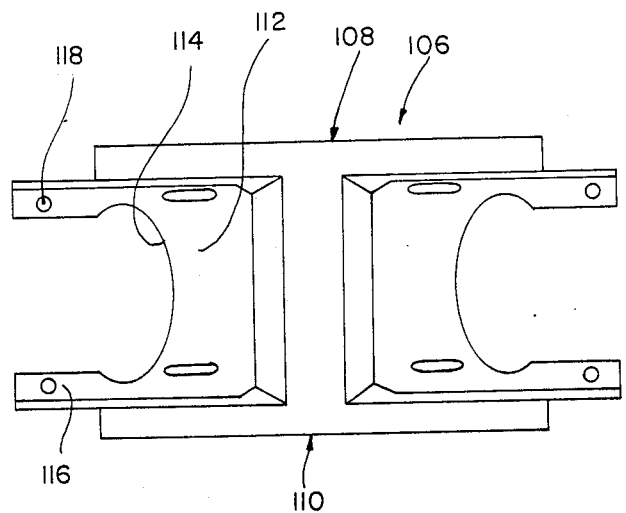
FIG. 7 is a side view of a tie channel used to tie adjoining sections of the busway as shown in FIG. 1 together.
Figure 8:
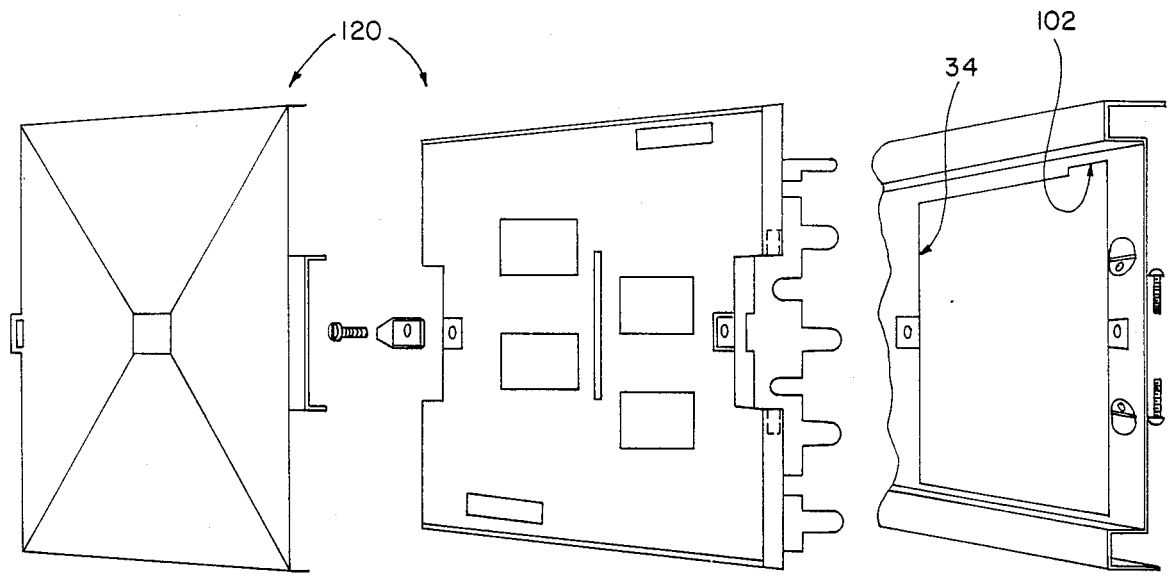
FIG. 8 is an exploded perspective view showing a plug-in base assembly and side rail of the present invention.
Figure 9:
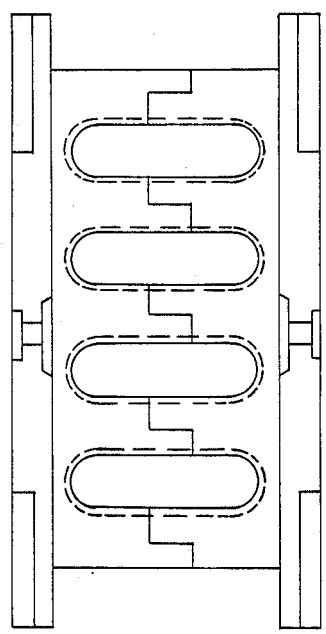
FIG. 9 is an end view of the base shown in FIG. 8 in back to back association with another base.
Figure 10:
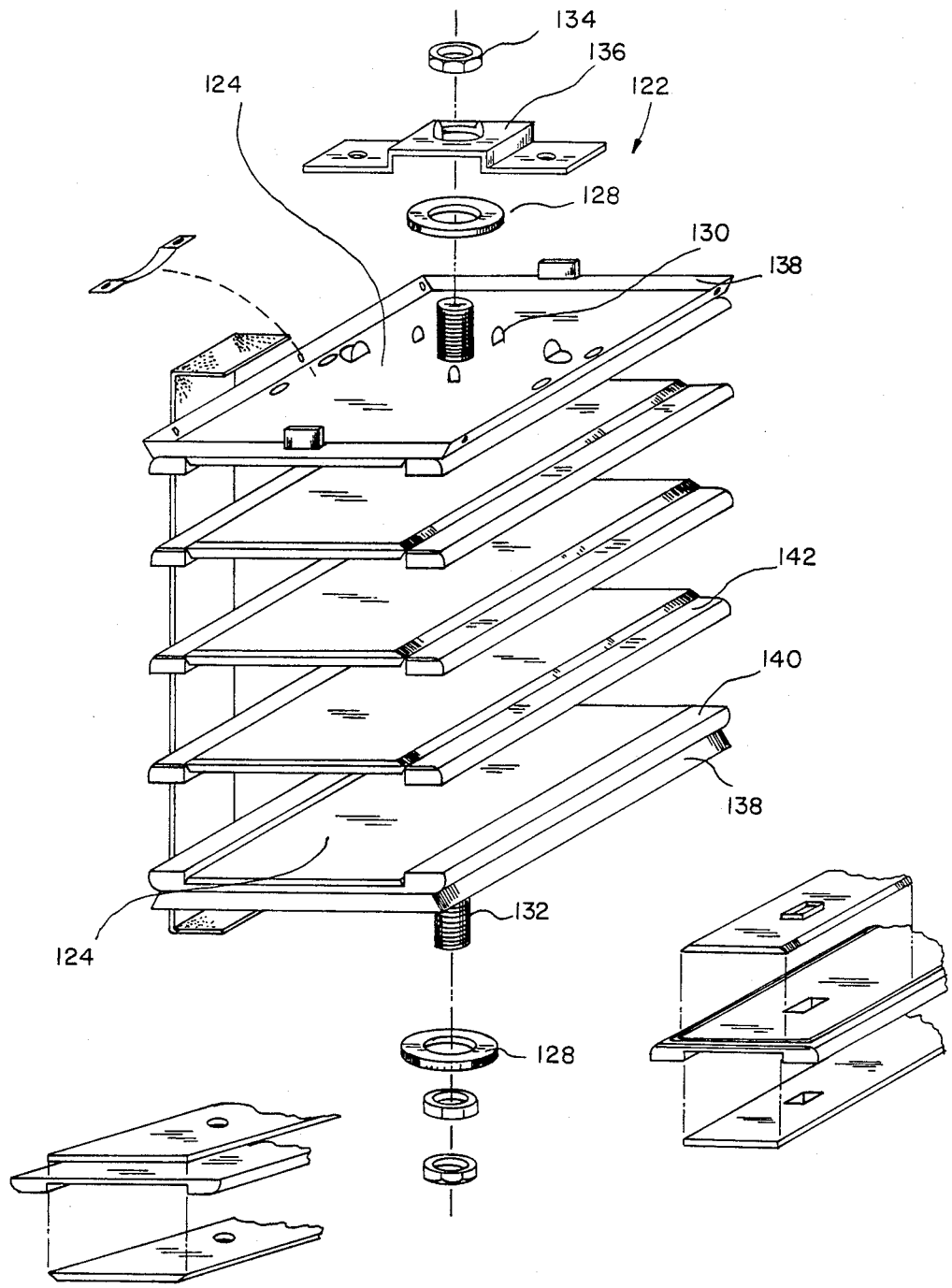
FIG. 10 is an exploded perspective view of a joint in accordance with the present invention.

The bus bars, each of which have a top portion 45, a bottom portion 47 and opposite edges 49, are the insulated as shown in FIG. 6 to permit tap-off and splice connections where necessary.

Insulating tubes composed of one layer of varnished glass cloth between two layers of polyethylene terephthalate are placed around each bus bar for electrical insulation. The tubes are provided with notched out segments 236 which overlie the edge of the bus bar at the transition portion of the humps. The tubes are spaced apart from each other on each bar to provide a tap-off contact surface 238 on each hump. The overlap of the tube is provided on the side toward which the bar is humped.

A hump insulator 240, which may be a strip of 0.015 varnished glass tape, is placed longitudinally along the length of the bus bar on the top and bottom of the hump between the opposing plug-in bases or between the plug-in base and the bus bar brace assembly 198 on multi sandwich sections of busway.

A hump edge insulator 242 formed from a polyproylene material is placed on the edge of the plug-in bars at the hump, covering the portion of the bus bar 244 which is exposed through the notches in the tubes. The edge insulator is generally U-shaped with a rounded base 146 and extending legs 248. The legs each extend approximately 1 inch and resiliently clasp the top and bottom surface of the bus bar while the base is provided with several ribs 250 which extend generally perpendicular to the direction of the insulated bus bar. The edge insulators are formed to conform with the particular edge that is engaged. Opposite diagonal edge insulators are identical which requires only two different edge insulators to properly fit each bus bar.

Any UL recognized electrical insulating tape rated 105 C or higher and having minimum thickness of 0.0075 inches is wrapped around the bus bar at the end joints.

The insulated main phase bus bars 40 are enveloped by a ground bus 42 which includes an upper section 44 and a lower section 46. The upper section includes a top portion 44a with opposite side flanges 46b extending toward the lower section. The lower section includes a bottom portion 46a with similarly extending side flanges 46b, although the lower side flanges are substantially shorter than the upper side flanges. The lower section 46 is positioned between the flanges 44b of the upper section, such that the two pairs of flanges are substantially aligned at the bottom edge thereof, with the main phase bus bars 40 sandwiched between the top portion of the upper section and the bottom portion of the lower section while also being located between the side flanges of the upper section.

Figure 2:
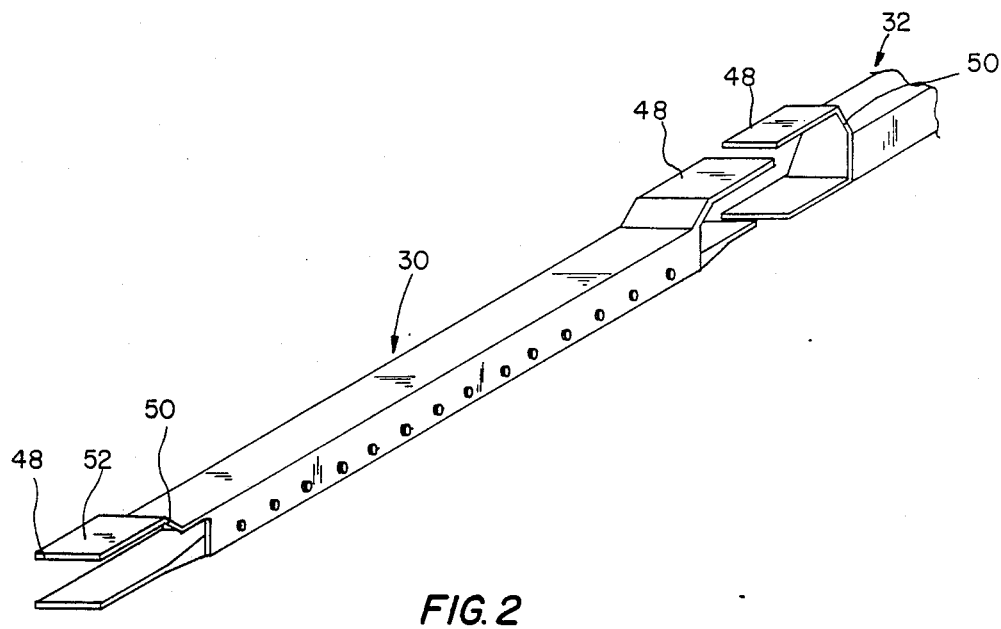
FIG. 2 is a perspective view showing the ground bus in accordance with the instant invention.
Figure 3:
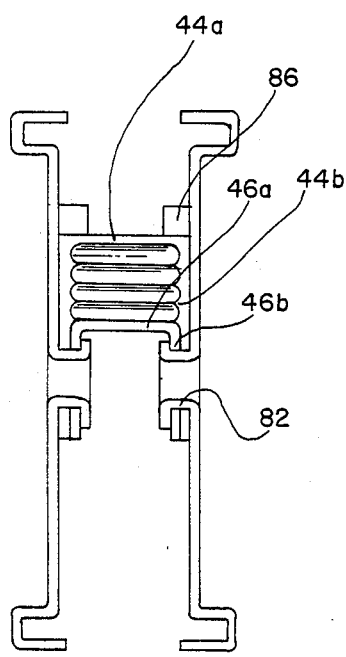
FIG. 3 is a cross sectional view showing the housing enclosing the main phase bus bars in accordance with the present invention.
Figure 4:
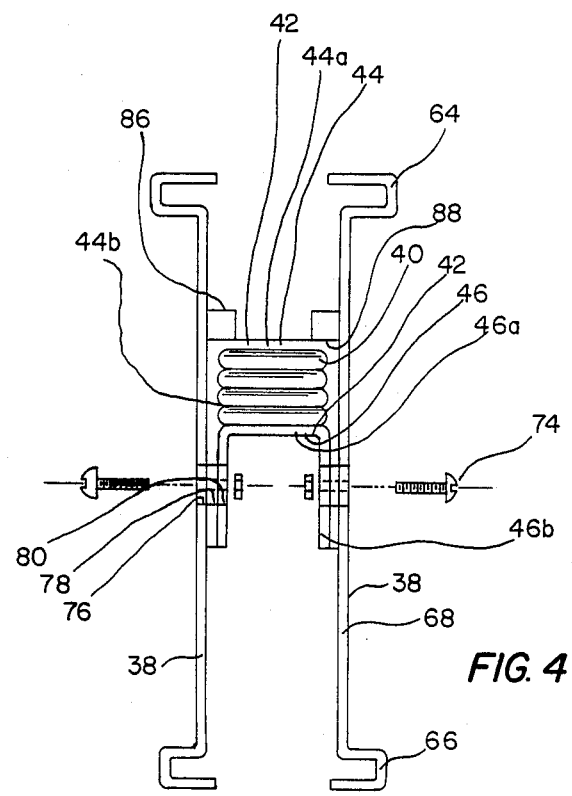
FIG. 4 is a cross sectional view as shown in FIG. 3 incorporating an alternate method of fastening.

On both the plug-in sections 32 and feeder sections 30, the ground bus includes a flared end portion 48 to accommodate the separation between bus bars required for splice connection between sections. The flared end portion 48 as shown in FIGS. 2 and 5 includes an inclined section 50 and an extending connecting portion 52 on both the upper and lower sections of the ground bus. The flared formation facilitates drainage of water which may fall on the joint area. The plug-in sections of busway include humped portions 54 on both the upper and lower sections of ground bus corresponding to the plug-in opening 34 locations along the length of the busway where humps are provided in the bus bars as previously described. Each humped portion 54 of the ground bus includes opposite inclined top transition portions 56 and a bridging top portion 58 integrally connecting the two inclined top transition portions as well as opposite inclined bottom transition portions and a bridging bottom portion integrally connecting the two inclined bottom transition portions. Plug-in openings are also provided in the ground bus at the plug-in locations.

The ground bus 42, together with the pair of opposite side rails 38 form a housing for the main phase bus bars. The opposing side rails each include a top channel 64, a bottom channel 66 and an inwardly recessed main side portion 68 intermediate the top and bottom channels. The rails are positioned such that the top and bottom channels are inwardly directed. At the end of each busway section, a cutout 70 is provided in the main side portion of each rail where the bus bars are offered to facilitate connection between portions and removal of a connection joint which is more fully described in U.S. Application Ser. No. 650,379 by Allan Slicer and Robert Whitney filed concurrently herewith, now abandoned, the disclosure of which is hereby incorporated by reference.

At various locations along the length of the housing the side rails 38 are fastened to the upper and lower ground bus sections, 44 and 46, respectively, as more fully explained in U.S. Application Ser. No. 650,377 by G. N. Jorgensen, G. A. McGoldrick and A. E. Slicer concurrently herewith, U.S. Pat. No. 4,673,229, issued June 16, 1987, the disclosure of which is hereby incorporated by reference. A referred to previously, the plug-in sections of busway are provided with plug-in openings 34 in the main side portions 68 of the side rails at selected locations at which points the bus bars are spaced apart to facilitate tap-off connections. The plug-in openings of the opposite side rails are provied at the same location along the length of the bus bars contained therein, i.e., the openings on one side rail are in registration with the openings on the opposite side rail. The opening is generally rectangular in shape and includes an offset notch 102 at the upper right corner to facilitate ground connections.

A ground clip 104 is fastened to the top portion of the ground bus by a fastener. Additional holes may be provided above the plug-in opening on the main side portion between the opening and the top channel to facilitate the riveted connection of the side rails to the upper section of the ground bus, if believed desirable.

A joint tie channel 106 is provided to help secure adjoining section so busway together. The tie channel 106 is substantially U-shaped with a top flange 108 and a bottom flange 110 which overlie the respective top and bottom channels 64 and 66 of the side rails 38 of adjoining sections of busway. A recessed securing portion 112 is provided at each end of the symmetrical tie channel which forms top and bottom segments of receiving channels at each end of the tie channel that receives respective portions of the channels provided on the side rails.

A generally mushroom-shaped cutout 114 is provided on each securing portion forming securing legs 116 which extend outward on each end of the tie channel 106.

Additional holes 118 are formed in the securing portion which facilitate connection of the tie channel to the side rails of the adjoining sections of busway.

Each plug-in opening 34 is associated with a swingable door 36 and a plug-in base assembly 120 which are more fully disclosed in U.S. Application Ser. No. 650,378 by Allan Slicer filed concurrently herewith, now U.S. Pat. No. 4,714,431, issued Dec. 22, 1987 the disclosure of which is hereby incorporated by reference.

The connecting joint 122 which is somewhat similar to the type shown in U.S. Pat. No. 3,384,854 is provided to facilitate the connection between sections of busway and can be used to connect a feeder section to anther feeder section or to a plug-in section. This connecting joint which has been previously referred to provides the splice connection between flanged end portions of adjoining sections of busway.

While the invention has particularly been shown and described with reference to a preferred embodiment, it will be understood by those skilled in the art that variations in form, construction and arrangements may be made therein without departing from the spirit and scope of the invention, all such variations are intended to be covered in the appended claims.

I claim:

1. A plug-in busway section having opposite ends adapted for splice connection to an adjacent busway section, said plug-in busway section comprising:
a housing including a pair of opposite side rails, an upper section ground bus and a lower section ground bus connected to said side rails intermediate said side rails, said housing having a plurality of plug-in openings longitudinally located along the length of said housing;
a plurality of bus bars having a top portion and a bottom portion and opposite edges, said bus bars sandwiched between said upper section ground bus and said lower section ground bus, each of said bus bars having opposite ends and including a flared portion at each end and a plurality of humps and transition portions intermediate and said ends; said bus bars associated in stacked back-to-back relationship intermediate said openings between said opposite ends and associated in spaced apart relationship at each of said plug-in openings to facilitate tap-off connection therefrom, said bus bars associated in spaced apart relationship at said opposite ends to facilitate splice connection, a plurality of said bus bars being identically formed and positioned in mirror image relationship with each other; and
insulating means for insulating said bus bars from each other, said insulating means comprising a plurality of insulating tubes wrapped around each bus bar, each tube including opposite ends, adjacent tubes on each bus bar spaced apart at the humps of the bus bar and extending over the adjacent transition portion, hump insulator strips respectively extending longitudinally along each hump portion of each bus bar on said top portion and on said bottom portion, said tubes provided with notched out segments in overlying relationship with said edge of said transition portions of said bus bars; and a plurality of hump edge insulators covering the edges of said bus bars exposed through said notched out segments.

2. A plug-in busway section as claimed in claim 1 wherein each said edge insulator is generally U-shaped with a rounded base and extending resilient legs.

3. A plug-in busway section as claimed in claim 2 wherein each said edge insulator is formed to be received over a respective edge of said bus bars.

4. A plug-in busway section as claimed in claim 3 wherein said edge insulator is formed form a polypropylene material.

5. A plug-in busway section as claimed in claim 2 wherein said insulating tubes comprise one layer of varnished glass cloth between two layers of polyethylene terephathalate.

6. A plug-in busway section as claimed in claim 5 wherein said edge insulator includes a plurality of generally parallel ribs extending from one leg, across said base, and to the opposite leg.

7. A plug-in busway section as claimed in claim 6 wherein each hump carries four edge insulators with diagonally opposite edge insulators being interchangeable.

* * * * *